United States Patent [19]

Koschak et al.

[11] Patent Number: 4,501,798
[45] Date of Patent: Feb. 26, 1985

[54] UNBALANCED ORIENTED MULTIPLE LAYER FILM

[75] Inventors: Matthew Koschak, Appleton; Scott S. Super; Jerry F. Jesse, both of Neenah, all of Wis.

[73] Assignee: American Can Company, Greenwich, Conn.

[21] Appl. No.: 492,016

[22] Filed: May 5, 1983

[51] Int. Cl.³ ............................................. B32B 27/00
[52] U.S. Cl. .................................... 428/349; 428/343; 428/354; 428/474.7; 428/474.9; 428/475.5; 428/475.8; 428/476.1; 428/476.3; 428/516; 428/570; 428/522; 428/910; 428/35; 264/290.2; 264/288.4
[58] Field of Search ............... 428/475.5, 475.8, 476.1, 428/516, 520, 522, 35, 910, 343, 354, 349, 479.7, 474.9, 476.3; 264/288.4, 290.2; 156/244.11, 244.14

[56] References Cited

U.S. PATENT DOCUMENTS

| | | | |
|---|---|---|---|
| 4,058,582 | 11/1977 | Bierenbaum et al. | 264/288.4 |
| 4,058,647 | 11/1977 | Inoue et al. | 428/476.1 |
| 4,064,296 | 12/1977 | Bornstein | 428/35 |
| 4,095,012 | 6/1978 | Schirmer | 428/476.1 |
| 4,188,443 | 2/1980 | Mueller | 428/216 |
| 4,194,039 | 3/1980 | Mueller | 428/213 |
| 4,254,169 | 3/1981 | Schroeder | 428/476.1 |
| 4,261,473 | 4/1981 | Yamada | 215/1 C |
| 4,405,667 | 9/1983 | Christensen et al. | 428/475.5 |
| 4,407,873 | 10/1983 | Christensen et al. | 428/475.5 |

Primary Examiner—George F. Lesmes
Assistant Examiner—E. Rollins Buffalow
Attorney, Agent, or Firm—Stuart S. Bowie; Thomas D. Wilhelm

[57] ABSTRACT

An unbalanced multiple layer polymeric film having good interfacial adhesions has a first molecularly oriented polymeric surface layer of nylon on one surface thereof, and a second molecularly oriented polymeric surface layer of a heat sealable ethylene-based polymer or copolymer on the other surface thereof. Films are disclosed having interior functional layers of EVOH and HDPE, along with adhesive polymers selected for good interfacial adhesion after orientation of the film in the machine direction. Processes for making and orienting the films are also disclosed.

7 Claims, 2 Drawing Figures

UNBALANCED ORIENTED MULTIPLE LAYER FILM

BACKGROUND OF THE INVENTION

There have been proposed a plurality of single and multiple layer sheet structures for packaging of products requiring significant functional protection from transmission of gaseous materials into or out of the package through the packaging film. For example, various food type products require barriers to transmission of oxygen, moisture, oils and the like. Numerous conventional single and multiple layer structures have been made to serve this end, with a moderate degree of success. Such structures include, for example, saran coated polypropylene, glassine, and the like. It is known to use multiple layer structures into which may be incorporated a separately formed layer of oriented polypropylene or oriented polyester, as well as functional barrier layers.

While such multiple layer films incorporating an oriented layer do provide certain improvements, they require a multiplicity of manufacturing steps which puts them at a competitive cost disadvantage to simpler films. Advantageously, though, the functional barrier benefits of the multiplicity of layers do provide overall improved barrier functions.

Other desirable attributes of film packages, and particularly those used for packaging certain foods, are related to the appearance and feel of the package; which translates into consumer perception of the package at the point of sale. Particularly desirable perceived attributes are gloss and stiffness, and, in some cases transparency.

A highly desirable combination of attributes, then, includes functional barrier properties to certain gaseous transmission, and perceived properties of gloss, stiffness, and sometimes, transparency.

Various attempts have been made to advantageously utilize the benefits of molecular orientation of films to achieve certain of the desirable properties. A serious problem in these developments has been that each different polymer has its unique required set of heating and stretching conditions. Where certain combinations of layer compositions do not have over-lapping conditions conducive to molecular orientation of the multiple layer film, additional provisions must be made for effecting the simultaneous orientation of the plurality of layers. Absent these provisions, in previous attempts to orient multiple layer films, adjacent layers have developed undesirable stresses at layer interfaces, and cohesive stresses within the layers themselves. These stresses too often have manifested themselves in poor interlayer adhesion at the layer interfaces, and in cracking or hole development in one or more of the layers.

Mueller, U.S. Pat. No. 4,188,443 handles this problem in a 5 layer film by selecting the compositions of the second and fourth layers such that they are above their melt temperature during the orientation process (col. 5 line 43). While this mechanism is successful in relieving the interfacial stresses of the orientation process, only 3 of the 5 layer may be truly molecularly oriented, and selection of material compositions for layers 2 and 4 may be severely limited by the melting temperature requirements.

Yamada, U.S. Pat. No. 4,261,473 teaches a balanched 3 layer film, as in his EXAMPLE 10, wherein the outer layers are polyethylene terephthalate and the core layer is EVOH. Sheets of this film are preheated for a lengthy 5 minutes, apparently to reach steady state temperature throughout the film thickness, before the film is stretched by drawing it into a "cup" shaped mold. Indeed, this process is more closely related to conventional thermoforming than to molecular orientation.

Mueller, U.S. Pat. No. 4,194,039 teaches a "balanced" 3-layer film (col. 6 line 23) that is a combination of olefins and olefin blends. The film is made by a plurality of extrusion steps and orientation steps.

Bornstein U.S. Pat. No. 4,064,296 teaches an oriented 3 layer film having EVOH as the core layer. However, in Bornstein's film it is "crucial" (col. 4 line 65) that one of the two outer layers be cross-linked, i.e. by irradiation.

In copending application, Ser. No. 446,009, filed Dec. 1, 1982, and of common assignment herewith, there are disclosed four and five layer unbalanced oriented films and method of orientation. The films disclosed therein all had polypropylene as one surface layer, and no film was disclosed as having more than five layers.

It is an object of this invention to provide a multiple layer packaging film material which may have up to seven layers, and including nylon as an outer layer thereof, the film being economically competitive to make, and having a combination of attributes including, as functional physical properties, high barrier to gaseous transmission through the film, high interlayer adhesion, and good tear strengths; and as available perceived properties, high gloss, transparency, and stiffness. Preferrably the films are unbalanced in that conventional heat sealing equipment may be used to apply heat to the nylon side of the film, driving the heat through the film without undue distortion of the film to effect heat sealing of the layer on the opposite surface of the film. Such unbalanced films are readily adapted for use in conventional packaging equipment to economically package a variety of products.

SUMMARY OF THE INVENTION

The inventors herein have found that certain unbalanced multiple layer polymeric films can be molecularly oriented by proper choices of layer structuring and processing conditions to achieve a heat sealable, high barrier oriented film. Illustrative of films of this invention is an unbalanced film where the layers are, in order; a first molecularly oriented layer of nylon, a second molecularly oriented layer whose composition is selected from the group consisting of nylon, ethylene vinyl alcohol copolymer (EVOH) and blends of nylon and EVOH, a third molecularly oriented adhesive layer, of nylon, a fourth molecularly oriented adhesive layer, a fifth molecularly oriented layer comprising a polyethylene or a blend of ethylene polymers, a sixth molecularly oriented adhesive layer, and a seventh molecularly oriented sealant layer. The fourth and sixth layers comprise carboxy moieties in an ethylene based polymeric structure; and most preferably, the composition of the fourth and sixth layers is modified medium density polyethylene (MMDPE) and the fifth layer comprises high density polyethylene (HDPE). Desirably the composition of the seventh layer is chosen from the group consisting of ionomer, linear low density polyethylene (LLDPE), low density polyethylene (LDPE) and ethylene vinyl acetate copolymer (EVA) having up to 18 weight percent vinyl acetate (VA).

In a similar structure, the first, second, and third layers all comprise nylon and are effectively a single layer. Under normal miscroscopic observation, the layer interfaces joining these three layers in this structure are nonexistant.

In any of the structures recited above, and in combinations thereof, certain advantages are achieved wherein the second layer comprises a blend of nylon and EVOH.

Certain novel aspects of the invention also reside in a method of making an unbalanced, oriented, multiple layer polymeric film wherein the interfacial adhesion at each layer interface is at least 150 grams per inch width, the film having a first polymeric surface layer of nylon on one surface thereof and a second polymeric surface layer of a heat sealable ethylene polymer, or copolymer on the other surface thereof. The novel method of orientation commences with the step of pre-heating each of the respective surfaces to separately pre-selected temperatures, the pre-selected temperature of the surface of the second surface layer being between 10° F. and 60° F. below the heat sealing temperature of the second surface layer, the pre-selected temperature of the surface of the first surface layer being between 150° F. and 230° F. After the surfaces are pre-heated, the pre-heated film is stretched, the stretched film is annealed, and finally the annealed film is cooled.

A particularly advantageous embodiment of the method is one wherein the surfaces are heated by passing a continuous sheet of the film over a series of heated rollers. The sheet passes over the heated rollers in such a configuration that each roller contacts only one surface of the film, and the temperature of each roller is controlled so as to apply an appropriate temperature to the surface so contacted. When the film surfaces are heated to the proper temperature, the film is then stretched oriented in the machine direction.

Preferably, the annealing is done by application of heat to the nylon surface layer, since it is less physically affected by the heat than the other surface layer.

DETAILED DESCRIPTION OF THE PREFERRED EMBODIMENTS

Figure 1:
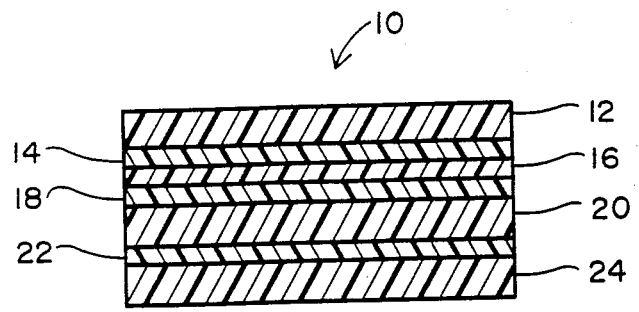
FIG. 1 is a cross-section of a representative 7 layer film of the invention.

Referring now to FIG. 1, the overall film is designated by the numeral 10. Layer 12 is nylon. Layer 14 is a barrier layer of either nylon, EVOH, or a blend of nylon and EVOH. Layer 16 is nylon. Layer 18 is an adhesive polymer. Layer 20 is an ethylene polymr or copolymer or a blend of ethylene polymers. Layer 22 is an adhesive polymer. Layer 24 is a heat sealable layer which may be selected with substantial independent judgement, depending on its adhesion requirements to the specific composition of layer 22 and the desired heat sealing temperature.

Figure 2:
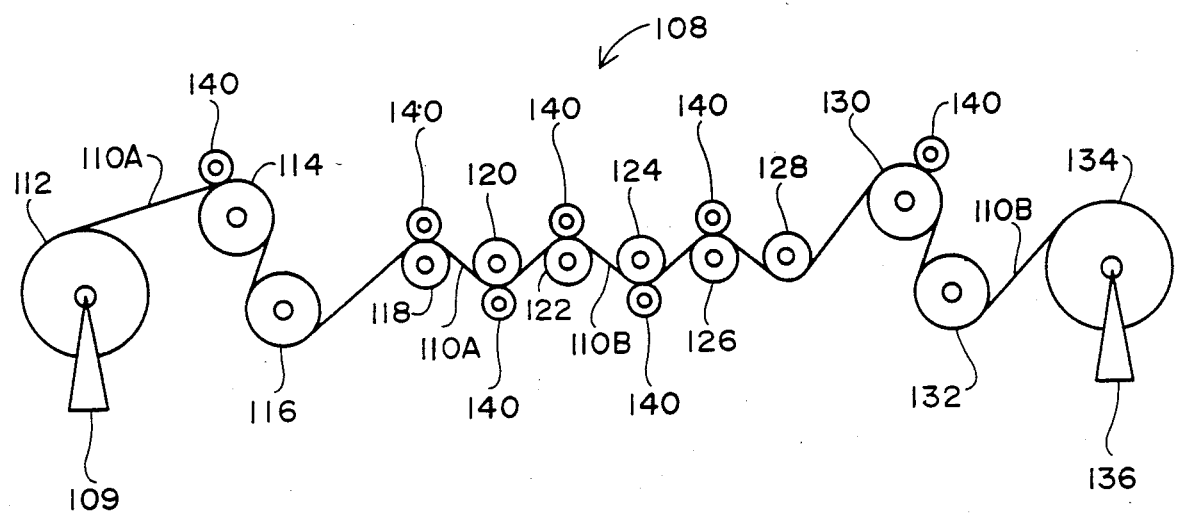
FIG. 2 is an outline of a representative line of processing equipment for carrying out the orientation of multiple layer films of the invention.

Referring now to FIG. 2, the overall layout of the equipment and film is designated 108. The layout includes an unwind station 109 from which is unwound a roll 112 of film 110A. The film first passes over a turning roll 114, from there to a first pre-heat roll 116, and thence is wound over a series of heated rolls 118, 120, 122, 124, 126, and 128. The film is stretch oriented between rolls 120 and 122 as indicated by the designation 110B for the stretched film. The stretched film is annealed on roll 130 and then cooled on roll 132. Finally, the stretched film 110B is wound up as a roll 134 on windup station 136.

Upon examination of the overall nature of the film hereinabove described, it is seen that there are disclosed seven layer films having the combination of at least six layers, and in most cases, all seven of the layers molecularly oriented, and wherein dissimilar polymeric material structures are associated with the several layers. More specifically, not all the layers of the films of this invention need be derivatives of the same family, e.g. polyethylenes, polypropylenes, or even polyolefins. Further, the compositions of the several layers need not have similar melt flow properties so long as they are compatible for a coextrusion process. Neither is it necessary, and indeed it is not desired, that any of the layers melt during the orientation process, as melting of any given layer would preclude true molecular orientation of that layer. From the perspective of desired physical properties of the overall film, it is generally preferred that all the layers be molecularly oriented. For reasons of facilitating construction of some members of the family of films of the invention, the sealant layer may, or may not, be oriented. For example, in some cases it is preferred to coextrude all the layers of the film except the sealant layer, and to orient the so coextruded multiple layer film. After orientation, the sealant layer, e.g. layer 24 is then added—for example by solution coating, by extrusion coating, extrusion lamination, or by heat and pressure lamination of a previously formed film. Other conventional means of adding a sealant layer to a separately formed film are also contemplated.

Definitions: Certain terms used herein require some clarification as to the intended meaning in order to preclude possible confusion as to their significance.

Throughout this teaching, the films of the invention are described as being "unbalanced". Unbalanced refers to the relationships of physical and chemical properties of the polymers relative to the symmetry, or lack thereof, of the film cross-section. In a generally balanced film the properties will be at least similar as one progresses from the two outside surfaces of the film toward the center of the film cross-section. Referring to a seven layer balanced film, which could be represented by the structure shown in FIG. 1 (though it is not intended herein to represent that inventive films illustrated by FIG. 1 are balanced), the outer layers such as 12 and 24 would have similar properties, and the next pair of layers such as 14 and 22 would have similar properties, and so on. The similarities in a balanced film usually are both chemical, e.g. polymeric structure and composition; and physical, e.g. melting properties, rheology of fluid flow, heat seal temperature, vapor permeation rates and the like. In unbalanced films, and now referring to the inventive films represented by FIG. 1, the outer layers, layers 12 and 24 are dissimilar in at least some properties, usually both chemical properties and physical properties. For example, layer 24 is usually an ethylene polymer or copolymer and has lower melting temperature and lower heat sealing temperature than the nylon of layer 12. Layers 14 and 22 are normally not similar. Their selection is based primarily on their individual functional purposes within the film, and not on their similarities to each other. Layer 14 is a barrier layer. Layer 22 is an adhesive layer. Like dissimilar comparisons can be made with the other corresponding pairs of film layers.

The term "carboxy moieties" refers to a plurality of functional group derivatives of carboxylic acids in the compound which include components such as

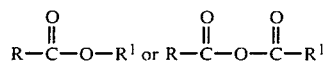

Illustrative of such carboxy structures are organic acids and acid salts, esters, and anhydrides.

The term "molecularly oriented" refers to the rearrangement of polymeric film by any process which simultaneously reduces the film thickness and elongates its dimension in at least one direction; all while the film is in a heated, but unmelted state. Specifically, "molecular orientation" does not include those processes that stretch the polymer when it is in a softened state, such as in blow-molding.

The phrase "heat sealing temperature" refers to that temperature, or range of temperatures at which films of certain polymers are susceptible to being sealed to themselves in face-to-face relationship by application of heat and pressure in conventionally known manner.

The term "annealing" refers to a step of temporarily holding a film at an elevated temperature under controlled levels of tension. This known process provides a degree of stability to a stretched film after it is cooled and improves performance characteristics.

Returning now to the invention in detail, layers 12 and 16 are advantageously nylon, and provide toughness and stiffness to the film. Nylon 6 is preferred. Modified nylon 6 has also been found particularly desirable. Where stiffness of the overall film structure is less important, nylon 666 may be used, too. Less preferred, but acceptable is nylon 12. The crucial property of the nylon in all cases is its capability to be coextruded in a 3-layer sub-combination as layers 12, 14, and 16. Thus the desirable properties of layers 12 and 16 alone must be considered in view of the anticipated composition of layer 14. Layer 12 should exhibit thermal stability under heat sealing conditions, and may contain surface modifying additives, such as slip and anti-block agents.

Layer 14 serves as a barrier to transmission of oxygen through the film. Acceptable barrier layer materials are EVOH, nylon, and blends of EVOH and nylon. Preferred compositions are EVOH. When blending is practiced, blends containing at least 50% EVOH are preferred to effect improved barrier to transmission of oxygen through the film. The finally selected composition of layer 14 is at times a compromise between the better oxygen barrier provided by EVOH, the lower cost attributed to a blend of nylon and EVOH, and the still lower cost of plain nylon. Skipping, for the moment, over layer 18, let us deal next with layer 20. The composition of layer 20 is chosen for one or more of the functions of (1) moisture barrier, and (2) physical strength in a relatively thick, economical layer. The preferred material for layer 20 is HDPE. HDPE provides an effective moisture vapor barrier at an economical cost. Other alternative materials for layer 20 are medium density polyethylene (MDPE), LDPE, LLDPE and blends of LLDPE with MDPE or HDPE and blends of MDPE with HDPE. The moisture barrier properties and cost vary, depending on the polymer selected, and the thickness of layer 20.

Layer 24 is a heat sealable layer. Its preferred composition is Surlyn ionomer which, in oriented form, has a heat sealing temperature of about 210° F. Another acceptable composition is LLDPE, which has a higher heat sealing temperature of about 260° F. Other acceptable compositions are LDPE and EVA having up to 18 weight percent VA. Above 18% VA, the surface of layer 24 is tacky and requires use of excessive amounts of slip and anti-block additives. Other conventionally heat sealable materials may be chosen for fulfilling specific film design parmaters. Slip and antiblock additives are commonly used with all the layer 24 compositions, in amounts of about 5% by weight of the layer composition, though higher percentages are contemplated. A typical slip and anti-block agent is sold as a concentrate called COMPOL 8719-3 by DuPont Company.

The most common problem in producing oriented multiple layer films of the nature disclosed herein is serious reduction, or failure of adhesion at the layer interfaces. In the structures disclosed herein, the interface most sensitive to adhesion problems is the interface between layers 22 and 24.

Now that layers 16, 20 and 24 have been defined, it is appropriate to discuss adhesive polymer layers 18 and 22; for their selection can only be made in light of the anticipated compositions selected for layers 16, 20 and 24. For use as adhesive layers, the polymers must contain carboxy moieties and preferably contain functional group derivatives of carboxylic acids and preferably anhydride derivatives. Moderate amounts of process experimentation are required with any new potential adhesive polymer in order to achieve acceptable levels of adhesion. This experimentation is required because all acceptable adhesive polymers are modified olefins, but not all modified olefins are functionally acceptable adhesive plymers in a given film structure, when applied by one specific set of processing conditions.

The most successful adhesive polymer known to the inventors for use in the preferred structure is a modified medium density polyethylene sold by Mitsui Company as Admer NF500. NF500 retains minimum levels of adhesion of about 150 grams per inch width, and typical adhesion levels are around 300 grams per inch. Other adhesives found acceptable with specific compositions of layers 16, 20, and 24 are modified low density polyethylenes.

In producing the oriented films of this invention, the selected polymers are first coextruded as a seven (sometimes six) layer film, and cooled, to yield a base film, unoriented. In coextrusion of the base film as, for instance, a seven layer film, the melted polymer streams which subsequently form the seven layer film are first combined as three subcombination melt streams as follows. Layers 12, 14, and 16 form one subcombination. Layers 18, 20, and 22 form a second subcombination. Layer 24 as a single stream is the third subcombination. Particularly addressing the first and second subcombination melt streams, it is important that the melt flow rheological characteristics of the polymer streams within each subcombination be compatible with each other to achieve acceptable coextrusive processing of the respective subcombination to form the desired layers. Preferably the nylon has a melt index of about 9, and the HDPE has a melt index of about 3. The subcombinations are kept physically separated from each other up to and during formation of the sheet-like layer structuring of the individual layers in each subcombination. This physical separation of the subcombinations permits separate control of the thermal environment of each subcombination. The subcombinations are finally joined to form the seven layer film just before exiting the die. After exiting the die, the film is cooled. While the cooled seven layer film may be immediately oriented in an in-line operation, it is entirely acceptable to wind up the film for subsequent orientation in a separate process such as the one outlined in FIG. 2. Uniaxial orientation in the machine direction is generally preferred.

In understanding the process of the invention, it is significant to understand that the composition defined for sealant layer 24 responds to thermal stimuli at a substantially lower temperature than other layers of the film and particularly the layer 12. Significantly, the inventors have found that by applying heat to each surface separately, and at a temperature selected to be compatible with the orientation of the composition of that layer and all the interior layers, and by applying that heat to each surface for a moderate period of time, the multiple layer films of this invention may be oriented; and indeed, an unbalanced film having up to seven layers and wherein the several layers need not be derived from the same polymer family, can be molecularly oriented without necessarily incurring splitting, pin-holing, or softening of any one layer.

It is significant to note that, with the number of layers in the invention reaching as high as seven, selection of the proper combination of polymers and layer thicknesses, compatible to simultaneous orientation, is a delicate task, requiring significant technical skill. With each considered increase in the number of layers to be simultaneously oriented, the complexity of selections of proper compositions and processing conditions is increased significantly. Thus, for example, layers 16, 18, and 20 are susceptible to transmission of heat from both surfaces of the film—those surfaces being on layers 12 and 24—and depending on the thickness and composition of each layer, and the thickness of the overall film, the processing conditions, including temperatures, orientation ratios and line speeds are adjusted to achieve successful orientation.

Advantageously, as the amount of stretch achieved is increased, while maintaining adequate levels of interlayer adhesion, the desirable properties of the film are enhanced. Disadvantageously, however, as the amount of stretch is increased, the adhesions at certain of the interfaces decreases. Thus, the selection of the best orientation ratio for any given film is dependent upon the specific film structure and the interlayer adhesion levels required by the intended end use of the film. For most packaging applications, interlayer adhesion levels must be at least 70 grams per inch width, as measured by ASTM D903. For films contemplated by this invention, and considering the adhesion levels required, satisfactory orientation ratios are normally between 2.5/1 and 4/1; with the preferred ratio being 3/1. The lower orientation ratios generally apply to structures having EVOH in layer 14 and wherein all the layers are simultaneously oriented. The higher orientation ratios are achieved wherein the layer (14) contains some nylon.

The heat applied to each of the surface layers, e.g. 12 and 24, is applied to the surface layers as they alternate contacting alternative ones of the temperature-controlled rolls.

As an illustration, consider the procesing through equipment of FIG. 2 of a typical film as in FIG. 1, wherein layer 14 is EVOH, layer 24 is Surlyn, and layer 20 is HDPE. Layer thicknesses of this "typical structure" are given in following Table 1. The film 110A is unwound from unwind station 109 at a speed of 60 to 80 feet per minute with the sealant layer 24 on the bottom surface of the film such that the sealant layer contacts the turning roll 114, which is kept at room temperature, or about 20° C. The film then progresses to the first pre-heat roll 116 which is temperature controlled at a critical minimum temperature of at least 70° C., and where layer 12 is against roll 116 and receives initial pre-heating. At the next pre-heat roll, 118, which is temperature controlled at 70° C., the sealant layer 24 contacts the pre-heat roll, and receives its initial direct-contact pre-heating. Layer 12 receives additional pre-heating at roll 120 which is temperature controlled at 90° C. The film is then stretched between rolls 120 and 122. This is accomplished by driving roll 122 faster than roll 120 and controlling the difference in drive speeds to effect the desired amount of stretch, hereinafter referred to as the orientation ratio—that being the fractional ratio of the driving speeds of the rolls 120 and 122. In this illustration, then, typical machine speeds during and after stretching are on the order of 180 to 320 feet per minute.

After the film is stretched between rolls 120 and 122, it is designated 110B, as shown between rolls 122 and 124. Roll 124 is again temperature controlled, in this illustration at 90° C., the same as roll 120. Roll 122 is temperature controlled at 70° C., the same as roll 118. Rolls 126 and 128 are controlled at 80° C. The film is then annealed by contacting annealing roll 130, which roll is temperature controlled at 80° C. After annealing, the film is cooled by chill roll 132 to less than 40° C., and is subsequently wound up on a roll 134 at wind up station 136.

In terms of heating contact time, the film is in contact with pre-heat roll 116 for about 1.8-4 seconds, and rolls 118 and 120 for about 0.9-3.2 seconds each. Contact time on rolls 122, 124, 126, and 128 is about 0.3-0.8 seconds each. Contact time on rolls 130 and 132 is about 0.6-1.0 second. Also significant to the process is good control of the film speed and contact on all rolls at all stages of the operation. Thus nip rolls 140 are used at several locations along the processing line as shown in FIG. 2.

As described briefly earlier herein, the layers which are primarily responsible for the physical properties of the film are layers 12, 14, 20 and 24. Layers 16, 18, and 22, on the other hand, serve primarily the functions of facilitating processing and providing interlayer adhesion. To meet the specific needs of a particular packaging use, the proportions of layers 12, 14, 20 and 24 can be adjusted somewhat; and usually the final structure is a compromise of properties which best meets the needs of the use while keeping the film cost competitive. Where stiffness is a major concern, the amount of layer 12, or layer 20, as a proportion of the film, is increased. Where oxygen barrier as measured by ASTM D-3985 is a concern, either the composition of layer 14 is adjusted or the amount of layer 14 is increased. Where water vapor transmission through the film, as measured by ASTM F-372 is a major concern, the amount of HDPE in layer 20 is increased. Where the heat seal properties of the film are critical, or are particularly sensitive, for example because of the product filling operations, the amount of the heat seal layer 24 is increased, or its composition is adjusted.

Considering that the overall thickness of the film is somewhat pre-determined by the type of packaging contemplated, and by the cost limitations, and considering that some polymers in the structure are more expensive than others, and that minimum amounts of each layer are required for minimal layer functionality, there exists a generally defined range of proportions which is acceptable for each of the seven layers.

Expressed in terms of the percentage of the thickness of the overall film, for a 1.0 mil oriented film, the approximate minimum functional thickness of each layer is shown in Table 1, along with examples of representative film structures.

TABLE 1

| Layer | Minimum Thickness | Typical Structure | Heat Seal Emphasis | High WVTR Barrier | Low Cost |
|---|---|---|---|---|---|
| 12 | 10% | 20% | 10% | 10% | 10% |
| 14 | 5% | 8% | 7% | 7% | 5%[1] |
| 16 | 3% | 5% | 3% | 3% | 5% |
| 18 | 5% | 5% | 5% | 5% | 5% |
| 20 | 20% | 20% | 20% | 40%[3] | 40%[2] |
| 22 | 5% | 5% | 5% | 5% | 5% |
| 24 | 25% | 37% | 50% | 30% | 30%[4] |
| Total Thickness Represented | 73% | 100% | 100% | 100% | 100% |

[1] Nylon
[2] LDPE
[3] HDPE
[4] EVA-5% VA

In the structures shown in Table 1, layers 12 and 16 are nylon in all structures. Layer 14 is EVOH or nylon-EVOH blend except as noted. Layers 18 and 22 are carboxy modified medium density polyethylene. Layer 20 is any of the polyethylenes except as noted. Layer 24 is Surlyn ionomer with 5% by weight slip anti-block additive concentrate, except as noted.

In light of the foregoing description of the several layers, it is seen that the structures of Table 1 are illustrative only, and that additional specific structures are contemplated by the foregoing description. For example, different minimum layer thicknesses may be defined for films of a different thickness or for films made by a different process, i.e. extrusion coating layer 24. As the composition and proportions of the various layers are changed, processing parameters must likewise be changed. Particularly sensitive are the temperatures of rolls 118, 120, 122, and 124. For example, in the Table 1 structure labeled "High WVTR Barrier", the increased amount of layer 20 HDPE as a proportion of the film requires that more heat be applied to that layer during the orientation process. Since layer 24 is sensitive, as a heat sealable layer, to increased amounts of heat, the higher heat required by layer 20 cannot be supplied through layer 24, but must, rather, be supplied through layers 12-18. Thus, when high proportions of HDPE are used in layer 20, the temperature must be increased in the pre-heating rolls which contact layer 12. Specifically, the temperature of rolls 120 and 124 is typically raised to 110° C., rather than the more typical 90° C., to achieve successful orientation. The temperature of roll 116 may also be raised.

The limitations on applying heat through layer 24 are functionally determined by the temperature at which polymer material from layer 24 sticks to one or more of the rolls which it contacts, and particularly rolls 118 and 122. Typically acceptable temperatures for rolls 118 and 122 are 70°-85° C.

In designing a specific process run, temperatures on rolls 118 and 122 are held as high as possible without incurring sticking of layer 24. The temperatures of rolls 120 and 124 are then adjusted to provide at least the minimal amount of heat to encourage successful orientation of the film structure.

A typical temperature range for the first pre-heat roll to contact layer 12, namely roll 116, is 70° to 100° C. Rolls 120 and 124 typically operate within the range of 90° to 110° C.

It will be seen from the examples given that the heating temperatures are selected and different for each of the film surfaces. Thus there is created a temperature differential between the two film surfaces, and the temperature differential is maintained during the orientation, and briefly after the orientation process pending the controlled cooling of the oriented film.

Rolls 126 and 128 are optional in the processing line. When used, they are typically held at about 80° C.; the preferred functional nature of rolls 126 and 128 being such that they are held at the maximum temperature possible without having layer 24 stick.

The annealing roll 140 is also held at about 80° C.

The following structures are specific examples of films of this invention. A slash line represents a layer surface. The percentage numbering in each example represents the percentage of the thickness of that layer compared to the thickness of the entire film.

| Example | Structure |
|---|---|
| 1 | /Nylon 6/EVOH/Nylon 6/NF500/LDPE/NF500/Surlyn/ B<br>20%   8%   5%   5%   20%   5%   37% |
| 2 | /Nylon 6/EVOH/Nylon 6/NF500/LDPE/NF500/Surlyn/ B<br>20%   8%   5%   5%   20%   5%   37% |
| 3 | /Nylon 6*/NF500/HDPE/NF500/LLDPE/ B<br>33%   5%   20%   5%   37% |
| 4 | /Nylon 6/EVOH/Nylon 6/NF500/HDPE/NF500/$^{95\% \text{ Surlyn}}_{5\% \text{ Compol 8719-3}}$/ C<br>20%   8%   5%   5%   20%   5%   37% |
| 5 | /Nylon 6/EVOH/Nylon 6/NF500/HDPE/NF500/$^{95\% \text{ Surlyn}}_{5\% \text{ Compol 8719-3}}$/ C<br>10%   8%   3%   5%   32%   5%   37% |

-continued

| Example | Structure |
|---------|-----------|
| 6 | /Nylon 6/EVOH/Nylon 6/NF500/HDPE/NF500/ 95% Surlyn 1601 / 5% Compol 8719-3/ <br> C <br> 10%   8%   3%   5%   50%   5%   19% |
| 7 | /Nylon 6/EVOH/Nylon 6/Chemplex 2467**/HDPE/Chemplex 2467**/ 95% 1601B / 5% 8719-3/ <br> A                              B <br> 20%   8%   5%   5%   20%   5%   37% |
| 8 | /Nylon 6*/NF500/HDPE/NF500/Surlyn/ <br>                                    B <br> 33%   5%   20%   5%   37% |

*This represents 3 nylon streams which lose their interfacial identity when they are joined.
**Chemplex 2467 is an adhesive polyolefin polymer available from Chemplex Company, Rolling Meadows, Illinois.

Table 2 shows significant measurements and properties of the above eight example films, which films were made according to the disclosed process principles, and oriented in the with-machine direction.

TABLE 2

| Example No. | Stretch Ratio | Thickness, mils, After Orientation | Interfacial* Adhesion grams/inch width | Tear Strength ASTM D-1922 MD | Tear Strength ASTM D-1922 CMD | WVTR 90% RH 100° F. |
|---|---|---|---|---|---|---|
| 1  | 3.0 | 1.4 | ALL CNS        | 60     | 189 | NA   |
| 2  | 3.6 | 1.4 | B:350          | 92-216 | 106 | NA   |
| 3A | 3.5 | 1.5 | B:242          | NA     | NA  | 0.57 |
| 3B | 4.0 | 1.4 | B:198          | NA     | NA  | 0.63 |
| 3C | 4.5 | 1.3 | B:175          | NA     | NA  | 0.64 |
| 4  | 3.0 | 1.5 | C:343          | 64-236 | 134 | 0.72 |
| 5  | 3.0 | 1.6 | C:263          | NA     | NA  | 0.38 |
| 6  | 3.0 | 1.6 | C:305          | NA     | NA  | 0.30 |
| 7  | 3.0 | 1.2 | A:106 B:42-146 | NA     | NA  | 0.65 |
| 8  | 3.0 | 1.5 | B:262          | 477    | 83  | 0.77 |

*All layers could not be separated (CNS) except those noted
NA = Data not available Surprising data are seen in the MD Tear Strengths of Examples 2 and 4. During the MD tear tests, which are performed according to ASTM D-1922, it is observed that the tear is initiated in the machine direction at a moderate level of force. During propagation of the tear, the tear direction changes, of its own accord, to a diagonal direction and the force required to continue the tearing process increases substantially, as seen by the data in Table 2, Examples 2 and 4. Indeed, in both cases the final MD tear strength exceeds the CMD tear strength, a highly unusual property in a uniaxially oriented film.

Thus it is seen that the invention provides a multiple layer packaging film material which has up to seven layers, including nylon as an outer layer thereof. The film is economically competitive to make by coextrusion and subsequent orientation of the entire cross-section thickness of the film all at one time. It has a combination of desirable attributes including, as functional physical properties, high interlayer adhesion, good tear strengths, and high barrier to gaseous transmission through the film; and as available perceived properties, high gloss, transparency, and stiffness.

In the examples illustrated herein, the film has been oriented so that layer 24 is on the bottom of the film and thus made the first roll contact at roll 114, while layer 12 has been up, first contacting a roll at roll 116. The invention may likewise be practiced with the film inverted, so that layer 24 is up and layer 12 is down. In this event, roll temperatures are adjusted accordingly, for the layers contacted. Advantageously, annealing roll 130 is then operated at a higher temperature of 115° C. or more, desirably improving the heat-set characteristics of the film.

Having thus described the invention, what is claimed is:

1. An unbalanced multiple layer polymeric film having two outer surfaces, and wherein the interfacial adhesion at each layer interface is at least 50 grams per inch width, the layers comprising, in order through the film:
    (a) a first molecularly oriented layer of nylon;
    (b) a second molecularly oriented layer whose composition is selected from the group consisting of nylon, ethylene vinyl alcohol copolymer, and blends of nylon and ethylene vinyl alcohol copolymer;
    (c) a third molecularly oriented layer of nylon;
    (d) a fourth molecularly oriented polymeric adhesive layer having carboxy moieties in the polymeric structure;
    (e) a fifth molecularly oriented layer comprising a polyethylene or a blend of ethylene polymers;
    (f) a sixth molecularly oriented polymeric adhesive layer having carboxy moieties in the polymeric structure; and
    (g) a seventh heat sealant layer; orientation of said film having been accomplished by applying heat directly to each of said outer surfaces in different amounts, thus creating a temperature differential between said surfaces, and effecting said orientation during the existence of said temperature differential.

2. An unbalanced multiple layer film as in claim 1 wherein said seventh sealant layer is molecularly oriented.

3. An unbalanced film as in claim 1 wherein said first, second, and third layers all comprise nylon and are effectively a single layer.

4. An unbalanced film as in claim 1 wherein the compositions of the polymers in said fourth and sixth layers comprise medium density polyethylene.

5. An unbalanced film as in claim 1 wherein the composition of said fifth layer comprises high density polyethylene.

6. An unbalanced multiple layer film as in claim 1 wherein the composition of said sealant layer is chosen from the group consisting of ionomer, linear low density polyethylene, low density polyethylene, and ethylene vinyl acetate copolymer having up to 18 weight percent vinyl acetate.

7. An unbalanced, molecularly oriented, multiple layer film having two outer surfaces, and wherein the interfacial adhesion at each layer interface is at least 150 grams per inch width, the seven sequential layers comprising, in order through the film:
(a) a first layer of nylon;
(b) a second layer whose composition is selected from the group consisting of nylon, ethylene vinyl alcohol copolymer, and blends of nylon and ethylene vinyl alcohol copolymer;
(c) a third layer of nylon;
(d) a fourth adhesive layer whose composition is a medium density polyethylene having carboxy moieties in the polymeric structure;
(e) a fifth layer whose composition comprises high density polyethylene;
(f) a sixth adhesive layer whose composition is a medium density polyethylene having carboxy moieties in the polymeric structure; and
(g) a seventh heat sealant layer; orientation of said film having been accomplished by applying heat directly to each of said outer surfaces in different amounts, thus creating a temperature differential between said surfaces, and effecting said orientation during the existence of said temperature differential.

* * * * *